United States Patent [19]
Becker et al.

[11] 3,937,353
[45] Feb. 10, 1976

[54] SYSTEM FOR THE TRANSPORTATION OF LOW-TEMPERATURE FLUIDS

[75] Inventors: Rudolf Becker, Munich; Max Bräutigam, Tacherting, Germany

[73] Assignee: Linde Aktiengesellschaft, Wiesbaden, Germany

[22] Filed: Sept. 26, 1973

[21] Appl. No.: 400,806

[30] Foreign Application Priority Data
Sept. 27, 1972   Germany............................ 2247220
Apr. 3, 1973    Germany............................ 2316607

[52] U.S. Cl................ 220/9 LG; 114/74 A; 220/15
[51] Int. Cl.²................... B65D 87/24; B63B 25/08
[58] Field of Search.......... 220/9 LG, 15; 114/74 R, 114/74 A, 747, 75

[56] References Cited
UNITED STATES PATENTS

| | | | |
|---|---|---|---|
| 2,537,085 | 1/1951 | Phelps............................ | 114/74 A |
| 2,810,265 | 10/1957 | Beckwith........................ | 220/9 LG |
| 3,010,574 | 11/1961 | Jacobson et al............. | 114/74 A X |
| 3,018,916 | 1/1962 | Henry............................... | 220/15 |
| 3,071,094 | 1/1963 | Leroux............................ | 220/15 X |
| 3,145,680 | 8/1964 | Parkas et al................... | 114/74 A |
| 3,273,740 | 9/1966 | Herrenschmidt.............. | 220/15 |
| 3,314,567 | 4/1967 | Becker et al.................. | 114/74 A X |
| 3,339,515 | 9/1967 | Reed............................. | 220/9 LG X |
| 3,403,651 | 10/1968 | Gilles............................ | 220/9 LG X |
| 3,425,583 | 2/1969 | Bridges........................ | 220/15 |
| 3,537,416 | 11/1970 | Cowles.......................... | 220/15 X |
| 3,830,180 | 8/1974 | Bolton............................ | 114/74 A |

Primary Examiner—George E. Lowrance
Assistant Examiner—Stephen Marcus
Attorney, Agent, or Firm—Karl F. Ross; Herbert Dubno

[57] ABSTRACT

An arrangement for the transport of low-temperature fluids, especially liquefied gases such as natural gas (i.e. methane) in a vehicle such as a sea-going vessel having a thermally insulated cargo compartment. The liquefied-gas storage container, composed of metal, has at least one side extending generally parallel to the wall of the compartment and is secured thereto against displacement perpendicular to this wall with at least one degree of freedom of movement relative to this wall in a direction parallel thereto. The storage container is constituted of a multiplicity of individual upright receptacles fastened together at their outer peripheries at upper and lower portions into at least one group of receptacles capable of thermal expansion and contraction, the storage container being anchored to the juxtaposed wall of the cargo compartment at upper and lower portions enabling relative horizontal movement of the container parallel to the wall. At least the upper anchor assembly also enables vertical displacement of the anchor member or members secured to the container relative to the wall.

23 Claims, 11 Drawing Figures

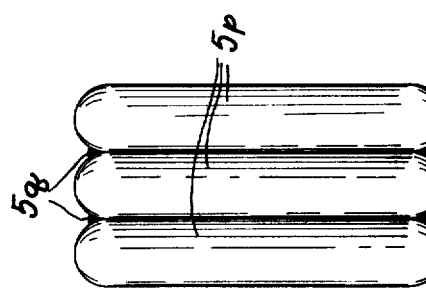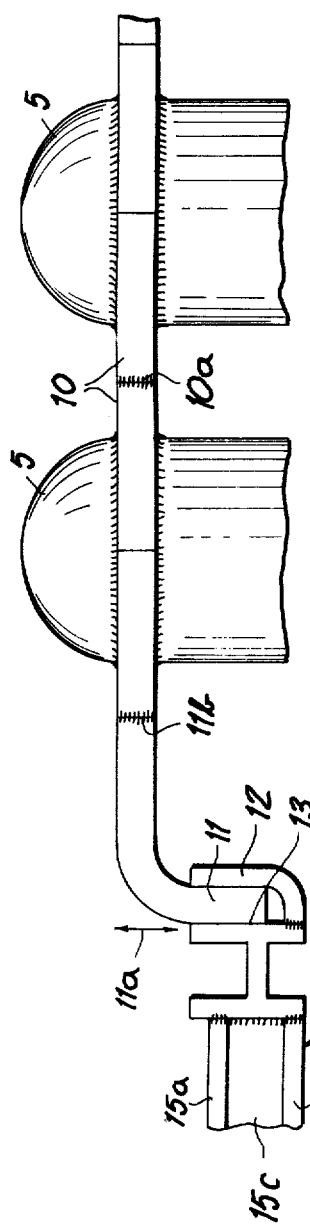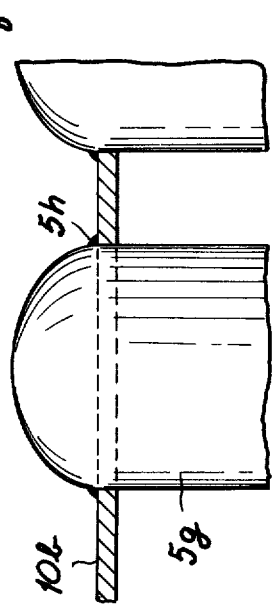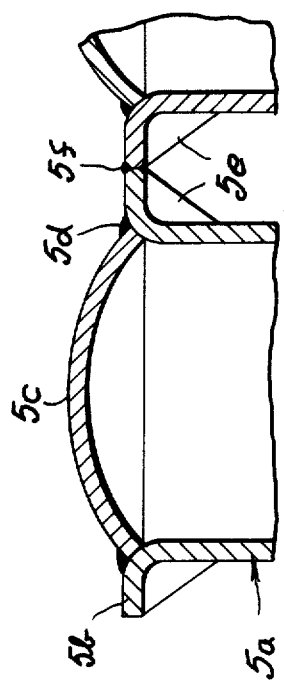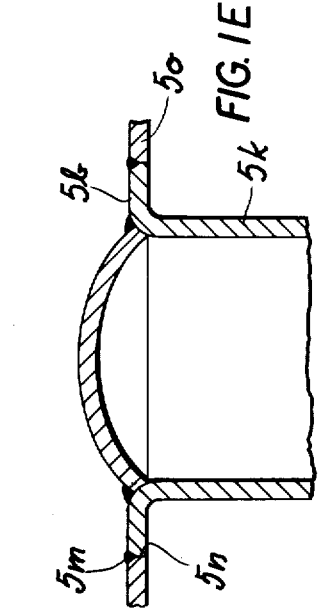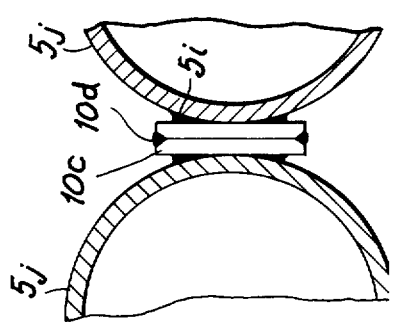

SYSTEM FOR THE TRANSPORTATION OF LOW-TEMPERATURE FLUIDS

1. FIELD OF THE INVENTION

Our present invention relates to the transportation and storage of low-temperature fluids and, more particularly, to a system for the transportation of such low-temperature liqds as natural gas (i.e. methane), nitrogen, ammonia and other commercial and industrial liquefied gases.

2. BACKGROUND OF THE INVENTION

In recent years, with increased demand for gases at locations relatively remote from their source, it has been the practice to provide liquefaction plants at the source, a conveyance or vehicle capable of transporting the liquefied gas over long distances, and a regasification plant proximal to the ultimate consumer at which the liquefied gas is converted into the gaseous state for use.

Such systems are especially important in the present power crises since natural gas (i.e. methane) may be readily available in regions quite remote from industrial sites, but may be in relatively short supply in industrial and residential areas. Hence the transportation of liquefied natural gas over long distances in an economical and safe manner is of the utmost importance.

Various transportation conveyances have been proposed for the purpose indicated and by far the most feasible is the ocean-going tank ship. There have already been described in the literature and constructed assemblies of receptacles, having a length which is considerable relative to their diameters, for disposition in the thermally insulated cargo compartments of such vessels. Thus a multiplicity of such individual receptacles may be disposed between decks or between the bottom of the hold and an overlying deck of a tank ship, the upper and lower ends of the individual receptacles being each secured to the deck and underlying floor with intervening layers of load-supporting thermal insulation.

The kinetic and inertial forces which are applied to the anchorages by the cargo upon rolling and pitching of the ship, however, have required that the tanks or receptacles be disposed in large measure above deck or that the decks be strengthened by massive reinforcements. To structurally stabilize the ship, therefore, a large part of the nominal cargo-carrying capacity may have to be sacrificed for structural stability and the ship may be invested with considerable deadweight. Furthermore, the cost of constructing such a vessel under existing principles of liquefied-gas storage may be inordinately high, especially in view of the low useful capacity of the ship. The economy of liquefied-gas transport in these vessels is generally low.

3. OBJECTS OF THE INVENTION

It is the principal object of the present invention to provide a system for the transport and storage of low-temperature fluids, especially liquefied gases, in which the aforementioned disadvantages are obviated.

Another object of the invention is to provide an improved arrangement for the transportation of liquefied gases in an insulated conveyance with greater economy, less need for reinforcing the deck structure of the conveyance and more effectively than has hitherto been the case.

4. SUMMARY OF THE INVENTION

These objects, and others which will become apparent hereinafter, are attained in accordance with the present invention with an arrangement for the transport of low-temperature fluids, especially liquefied gases, in a conveyance having a thermally insulated cargo compartment with vertical walls. The liquefied-gas container disposed in the compartment and composed of metal, has at least one side extending generally parallel to one of the vertical walls of the compartment and secured thereto against displacement perpendicular to this wall but with at least one degree of freedom of movement relative to the wall in a direction parallel thereto.

According to an important feature of the invention the liquefied gas container is made up of a multiplicity of upright individual receptacles fastened together into at least one group at upper and lower peripheral portions of the mutually adjacent or neighboring receptacle so that each receptacle adjoins and is rigidly fixed to a plurality of such neighboring receptacles. The group of rigidly interconnected receptacles is anchored to at most two mutually adjoining upright walls of the cargo compartment along juxtaposed flanks of the group by anchor assemblies which permit relative horizontal movement of each flank and the juxtaposed wall but prevent relative movement of each flank and the juxtaposed wall in a direction perpendicular to the walls. Thus each group is rigid with a pair of such adjoining lateral walls of the cargo compartment at the flanks of the group juxtaposed therewith and in a direction perpendicular to them.

With this construction, when a group of individual receptacles fixed together is disposed in the thermally insulated cargo compartment of a sea-going vessel and the upper and lower ends of the receptacles are secured together, the attachment of the group of receptacles to two mutually perpendicular vertical walls of the cargo compartment so that in two mutually perpendicular directions perpendicular to these walls a rigid connection is provided ensures that the inertial forces are first localized within the receptacle group and then are transferred to the compartment walls in a direction perpendicular thereto. No excessive loading of the insulated roof of the cargo compartment occurs and special measures need not be taken to reinforce the deck. All of the inertial forces are transferred to the lateral walls of the ship or to the bulkheads or coffer dams running perpendicular thereto, these walls being in any event dimensioned to resist large forces and of high stability. The ship's deck remains completely unstressed by the cargo.

The problem of compensation of the thermally induced relative movement of the compartment and the receptacle groups is solved, in accordance with the invention, in that each container group is fixed to only two mutually adjoining lateral walls of the cargo compartment. In the case of a tankship these walls include one lateral wall of the ship hold and one bulkhead or coffer dam. Since each flank of the container group juxtaposed with one of these two compartment walls can expand and contract in directions parallel thereto (while being constrained against movement relative to the juxtaposed wall and perpendicular thereto) the entire container group is free to expand or contract in a direction away from and toward the corner formed between the mutually adjoining compartment walls to which the container group is anchored. Thermal stress within the container group is thus avoided upon contraction of the latter upon the filling of the individual receptacles with liquefied gas or upon expansion following the discharge of liquefied gas.

In other words, the container group is anchored to the bulkhead (extending perpendicular to an adjoining lateral wall of the ship's hold) so that relative movement of the juxtaposed flank of the container group in the horizontal direction toward and away from the adjoining lateral wall of the hold is permitted. Similarly the container group is anchored to the lateral wall of the hold in such manner that horizontal displacement of the juxtaposed flank of the container group is permitted in the direction of the bulkhead or cofferdam.

The anchor assemblies are also so constructed that at least the upper anchor assemblies along the coffer dam and the adjoining lateral wall of the hold permit vertical expansion and contraction of the container group, thereby procluding stressing of the latter upon elongation or shrinkage of the flanks in any direction.

Complete transfer of the inertial forces to the vertical walls of the hold is thus ensured without loading of the roof of the cargo compartment and without the development of thermal stresses within the container group.

While the present invention concerns the container structure and its mounting within the cargo compartment of a tank ship or the like, it should be noted that any desired means for filling and emptying the individual receptacles may be provided. Preferably we use one of the systems described in the commonly assigned copending applications Ser. No. 300,271, filed Oct. 24, 1972, now U.S. Pat. No. 3,842,613 or Ser. No. 318,161 filed Dec. 26, 1972, now U.S. Pat. No. 3,831,811 Rudolf Becker, one of the present joint applicants.

Advantageously, the cargo compartment of the conveyance is of rectangular or square plan or horizontal cross-section with four walls adjoining in pairs at right angles, the individual receptacles being secured together in four container groups, each secured to two of the vertical compartment walls adjoining the one of the aforementioned right angles. The flanks of the container groups facing one another may be spaced apart and are free from attachment to the cargo compartment walls or to each other to eanble free expansion and contraction of each container group.

Various means may be used to join individual receptacles into common container groups. In one embodiment of this invention, therefore, each container group comprises upper and lower plates to which the cylindrical walls of the individual receptacles are welded at their upper and lower ends. These plates may be imperforate.

Alternatively, the individual receptacles of each container group may be provided with flat flanges at their upper and lower ends, the outwardly extending flanges of the neighboring receptacles being welded together. In this case, it has been found to be advantageous to increase the stability of the container group at the junctions or welds by enforcing the peripheries of the containers in these regions. Additionally, the containers may be received in perforations or holes of an upper and a lower plate and peripherally welded thereto either by the aforementioned flanges or directly along the circumference of the cylindrical outer wall of each receptacle.

While the individual receptacles may extend substantially fully between the floor of the compartment and its ceiling or roof, it is also possible to mount a plurality of container groups in stacked relationship so that one container group is disposed spacedly above another between the roof and the floor of the compartment, each of the stacked container groups being independently mounted upon the vertical walls of the cargo compartment in the manner previously described.

In a preferred embodiment of the invention, the flanges by which the individual receptacles are joined together are formed by individual rings having circular inner peripheries close fitting and welded to the outer surface of each receptacle at an upper and a lower end thereof. The outer peripheries of these rings may be polygonal, i.e. may conform to an equilateral polygon such as a hexagon so that within the body of the container group, each straight side of the polygonal periphery of the ring is welded to a straight side of a ring of a neighboring receptacle. In the case of a hexagon, therefore, a receptacle may be surrounded by six neighboring receptacles and welded to the rings thereof by its rings, the container assembly or group having a honeycomb pattern. The rings have the advantage that they may be used on reinforced or nonreinforced receptacle shells and can provide attachment sites for the anchors of the assemblies at securing each container group to the vertical walls of the cargo compartment.

Flat connecting members may be provided in place of the bottom and top plates of the container group and can be welded together to join the adjacent receptacles into a unitary container with planar upper and lower surfaces. This has been found to be especially advantageous when the roof and floor of the cargo compartment are likewise planar and horizontal, in which case the top and bottom of each container group may closely approach the roof and floor of the compartment.

The use of polygonal flanges to secure the individual receptacles into a unitary group has the advantage that the weld seams are not stressed significantly by the loaded containers and hence the dange of rupture within a container group at the weld seam is minimized.

While we have specified that the individual receptacles are to be connected to their neighboring receptacles at locations close to the top and bottom of the receptacles, thereby accomodating vertical expansion or contraction of the container assembly, it may be advantageous to provide intermediate connecting sites as well. Thus, one or more bridging pieces may be welded between the containers at locations spaced apart over the height of the individual receptacle and intermediate the top and bottom weld sites. This has proven to be especially desirable when tall receptacles are used and large vertical shrinkage or elongation is to be expected.

We have found that best results in the anchorage of the container group to at most two mutually adjoining lateral vertical walls of the cargo compartment can be attained when the anchor assembly comprises two interengaging anchoring members including an upwardly bent member and a downwardly turned member reaching behind one another and accommodating relative horizontal displacement. Thus the flank of the container group juxtaposed with a vertical wall of the cargo compartment may be provided with a plurality of anchor members reaching toward the wall and having downwardly turned end portions while the wall is provided with anchor members reaching toward the container flank and provided with upwardly turned end portions reaching behind the downwardly turned end portions of the first anchor members. Advantageously, the upwardly turned portions of the second anchor members define horizontal channels in which the downwardly turned end portions are free to move horizontally parallel to the wall and also may be capable of vertical displacement. The members attached to the cargo-compartment wall, moreover, are preferably mounted on horizontally extending guide rails which may be spaced apart to accommodate thermal expansion and contraction.

The system is so designed that, with maximum shrinkage of the container in its deeply cooled state, the interengaging bent portions fully contact one another while in an expanded state of the container, corresponding to a warm and empty condition, the interfitting bent members only partly engage one another. The bent members should also be so dimensioned that no significant relative displacement of the flank and the juxtaposed compartment wall will result in a direction perpendicular to the flank or the wall.

According to another feature of the invention, the anchor assemblies for attaching the container, preferably constituted of a multiplicity of rigidly connected receptacles, to the vertical walls of the cargo compartment includes a T-cross-section beam mounted on the container structure and having a horizontal shank, the wall being provided with a generally C-section guide rail receiving the head of the T and enabling the beam to shift relative to the rail in the horizontal direction.

A plurality of such beams may be horizontally aligned along the container and preferably all are received in a single guide channel mounted on at least two supports to the lateral wall of the ship. The supports are spaced along the guide channel and the latter is dimensioned to have sufficient rigidity to effect a uniform transfer of force to the ship wall in a direction perpendicular thereto.

In addition, at least the upper assembly is provided with means for enabling vertical displacement of the guide channel relative to the ship wall to accommodate thermal expansion and contraction in the vertical direction. To this end the guide channel may be formed along its base turned away from the horizontal slot in which the T-section beams are received, with a plurality of vertically extending but horizontally spaced T-shaped slots accommodating vertical T members attached to a rigid beam which, in turn, is mounted on the ship wall with at least two supports in the manner previously described. Thus, the horizontal T groove serves to guide the horizontal T bars for relative movement of the flank of the container or container group and the ship wall parallel thereto while the vertically extending T slots enable expansion upwardly of the container or container group.

The system is substantially free from play in the horizontal direction perpendicular to the ship wall so that inertia forces can be transferred from the container to the latter wall without stressing the container assembly.

The force-transmitting beams mounted at spaced locations along the ship wall preferably have a U-shaped cross-section accommodating in its channel the heads of a plurality of bolts (preferably two) which extend perpendicular to and bear against the vertical wall of the cargo compartment. The force-transmitting bolts preferably are not directly in contact with the lateral walls to avoid heat-transfer to the container within the cargo compartment. Thus we have found it to be advantageous to provide an insulating arrangement between the anchorage of the bolt and the metal wall of the ship.

The bolt-insulating assembly, according to this invention, comprises a disk or ring threaded onto the bolt in the manner of a nut in a space between two parallel walls of a double-wall structure defining the cargo compartment, the ring forming a force-transmitting shoulder. Flanking the ring we provide a pair of annular blocks of force-transmitting thermal insulation, one of which is interposed between the shoulder and the wall and the other of which is positioned on the other side of this shoulder. The assembly is received within a housing welded to the ship wall and close-fitting around the blocks, a cover plate spanning the end of this housing and serving as a seat for the other insulating load-transmitting block. The ring is disposed with annular clearance within this housing and a further insulating sleeve or bushing is disposed therearound to prevent the transfer from the housing to the bolt. The thermally insulating blocks and sleeve can be composed of any insulating material of high compressive strength and for this purpose we prefer FERROZELL or PERTINAX.

Best results are obtained when heat flow or cold loss through the bolt is prevented by constituting the latter of a material of low thermal conductivity such as $V_2A$ steel. The threaded connection of the ring to the bolt allows adjustment of the support structure to compensate for manufacturing tolerances between the liquefied-gas transport container and the lateral walls of the cargo compartment. This system has the advantage that the bolt mounting lies in an inner compartment of the ship hull and is not affected by the temperature within the cargo compartment or the atmosphere within the wall compartment since it is fully protected by the aforementioned housing.

Throughout this disclosure, reference has been made to the cargo compartment of a tank ship or other conveyance and it is important to note that such compartments are understood to be lined with thermal insulation at least along the floor and ceiling of the compartment and usually along the lateral walls of the ship as well. The bulkheads or coffer dams may or may not be thermally insulated. When container and the group of receptacles rest upon the floor of the cargo compartment, this layer of thermal insulation should be of a load-supporting type and may include a layer of wood boards or the like. Furthermore, it has been found to be advantageous to provide a space between the container flank and the wall of the cargo compartment to which it is affixed to prevent abrasion or other damage to the insulating layer thereof with relative movement of the container and the cargo compartment resulting from thermal expansion and contraction. All movable parts of the anchor assembly, moreover, are disposed externally of the insulating layer to prevent damage thereto.

5. DESCRIPTION OF THE DRAWING

The above and other objects, features and advantages of the present invention will become more readily apparent from the following description, reference being made to the accompanying drawing in which:

FIG. 1A is a side elevational view of an outer arrangement similar to that shown in FIG. 1;

FIG. 1B illustrates in vertical section another system for connecting the containers together in accordance with the present invention;

FIG. 1C is a view similar to FIG. 1B showing still another arrangement for interconnecting the containers;

FIG. 1D is a horizontal section through two adjacent containers secured together in another manner;

FIG. 1E is a vertical section showing a system wherein the containers are mounted in a perforated plate;

FIG. 1F is a vertical elevational view of a portion of a container group according to the present invention connected together in a different manner from those illustrated previously;

6. SPECIFIC DESCRIPTION

Figure 1:
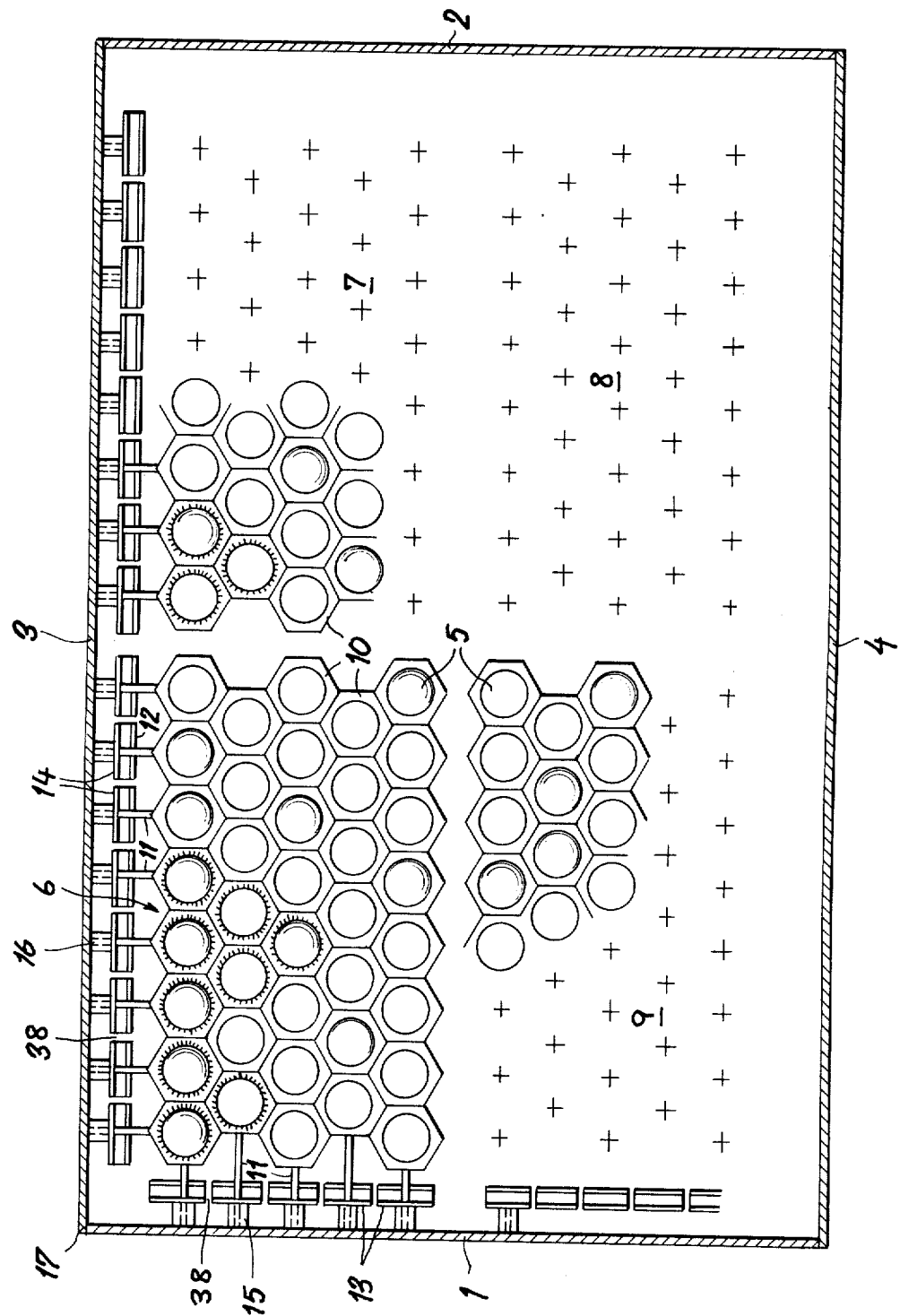
FIG. 1 is a somewhat diagrammatic plan view of a load-receiving compartment or hold of a tankship according to the invention, partly in cross-section and partly broken away.

In FIGS. 1 and 1A, we have shown a portion of the hold of a tankship which is provided between a pair of coffer dams 1 and 2 and the two longitudinal walls 3, 4 of the ship. Within the hold there are provided a multiplicity of storage recptacles or containers 5 of similar cross-section adapted to receive a low-temperature fluid, especially liquefied gas such as methane, ammonia, nitrogen . . . .

Neighboring receptacles or containers 5 are fastened together in four groups 6, 7, 8 and 9 whereby each of the containers of each group are provided along their lower end (not shown) and in their upper regions with metal rings 10 (FIG. 1) having circular inner openings close-fitting about the containers 5 and hexagonal outer peripheries. Each of the groups 6, 7, 8 and 9 may be thought of as a separate fluid container comprising a plurality of joined neighboring receptacles or containers 5.

The containers 5 are welded circumferentially to the rings 10 and the rings are hexagonally close-packed, so that each ring has its sides juxtaposed with sides of adjacent rings and fixed thereto, e.g. by welding. In other words each container surrounded by 6 other containers in a honeycomb pattern has all six of the straight sides of its hexagonal ring fixed to one side of each ring of a neighboring continaer. The outer row of containers (i.e. the containers along the lateral walls 3 and 4 of the hold of the ship) generally are secured to four adjoining containers at four sides of their hexagonal rings while alternate containers 5 along the coffer dam walls 1 and 2 are secured to 4 and 5 adjacent containers respectively. At the corner of each array or group 6, 7, 8 or 9, the rings 10 of the containers are secured to two adjoining rings of the respective group. The hexagonal rings are equilateral and may serve to space the containers from one another at least in the regions at which the rings are provided. As a result each container is rigidly secured to its nearest neighbor of the same group and can be secured to a maximum of six such nearest neighbors.

The connection of each fluid container or group 6, 7, 8 or 9 with the coffer dam 1, 2 and the lateral walls 3, 4 of the ship is effected by anchors 11 (identified for the group 6). The anchors 11 disposed between the coffer dam 1 and the fluid container or group 6 are alternately welded to the containers 5 at the containers approaching and set back from the coffer dam, either along the wall of the container or at the associated rings 10 or both. Similarly, the anchors 11 between the lateral wall 3 of the hold of the ship and the fluid container or group 6 may be welded to the row of containers 5 disposed parallel to this wall or to the rings associated with these containers.

At their ends turned toward the walls 1 and 3 (FIG. 1) the anchors 11 may be turned downwardly (perpendicular to the plane of FIG. 1 and extending away from the viewer) and into upwardly open channels formed by oppositely bent members 12 of intermediate anchors which may be mounted on the guide rails 13 and 14 parallel to the walls. The guide rails 13 and 14 are secured to the walls 1 and 3 by pedestals 15 and 16 which may have the configuration of H-beams, I-beams or other supporting structural sections. Thus the group 6 is fixed by the members 11 through 15 against displacement perpendicular to the walls 1 and 3 along the periphery of the groups which are juxtaposed with these walls. However, the channels formed by the upwardly bent members 12 permit displacement of the downwardly bent ends of members 11 parallel to the walls 1 and 3 and hence a sliding engagement of the group of containers with the coffer dam and the ship's wall. Thermal expansion and contraction of the container group with respect to the supporting walls 1 and 3 is thus permitted without resulting in stress within the group and the entire group or fluid container can expand and contract only toward and away from the corner 17 defined by the coffer dam 1 and the lateral wall of the ship.

Similarly each fluid container is supported along one of the walls 1–4 with one surface parallel thereto against displacement perpendicular to the wall and the flank of the group and is similarly supported with respect to another wall 1–4 of the hold while being free to expand or contract along these walls and having the other two sides of the generally rectangular group free from support.

An expansion/contraction clearance 38 is provided between the mutually aligned guide rails 13 of each of the supporting walls to enable compensatory thermal expansion and contraction of the rails parallel to the respective coffer dams 1, 2 and lateral walls 3, 4 of the ship. The groups of containers 7 through 9 are, of course analogously secured to the neighboring coffer dams and lateral walls of the ship.

As can be seen from FIG. 1A, the members 15 may be I-beams with horizontal flanges 15a and 15b and a vertical web 15c, the anchor 11 being received within the channel formed by the upwardly bent member 12 with vertical mobility in the direction of arrow 11a whereby vertical expansion and contraction of the individual containers or tanks is permitted. The welds between the anchor 11 and the hexagonal ring 10 are represented diagrammatically at 11b and the welds between the rings can be seen at 10a.

In FIG. 1B we show a system which is generally similar to that of FIG. 1 with respect to the anchoring system except that the containers 5a and outwardly extending flanges 5b are formed with cover domes 5c welded at 5d to these flanges. The flanges may be reinforced by ribs 5e which can be provided at the upper and lower ends of the containers in the region at which they are to be joined together. In this embodiment, weld seams 5f are provided between the flanges of the acjacent containers.

In the modification of FIG. 1C, the containers 5g are held together in groups by upper and lower preforated plates 10b through which the upper and lower ends of the containers pass and in which the containers are welded peripherally at 5h.

In the embodiment of FIG. 1D, the containers are provided with flange plates 10c which are welded together at 10d and are, in turn, welded at 5i to the containers 5j, thereby retaining the containers in the respective groups. FIG. 1E represents a modification in which the flanges 5b of the containers 5k are welded at 5m into openings 5n formed in a perforated plate 5o connecting the containers together.

According to yet another embodiment of the invention, the containers may be flat as shown in FIG. 1f or the containers 5p and can be welded together at 5q at their upper and lower ends. In this embodiment, the major dimension of the containers is perpendicular to the plane of the paper.

Figure 2:
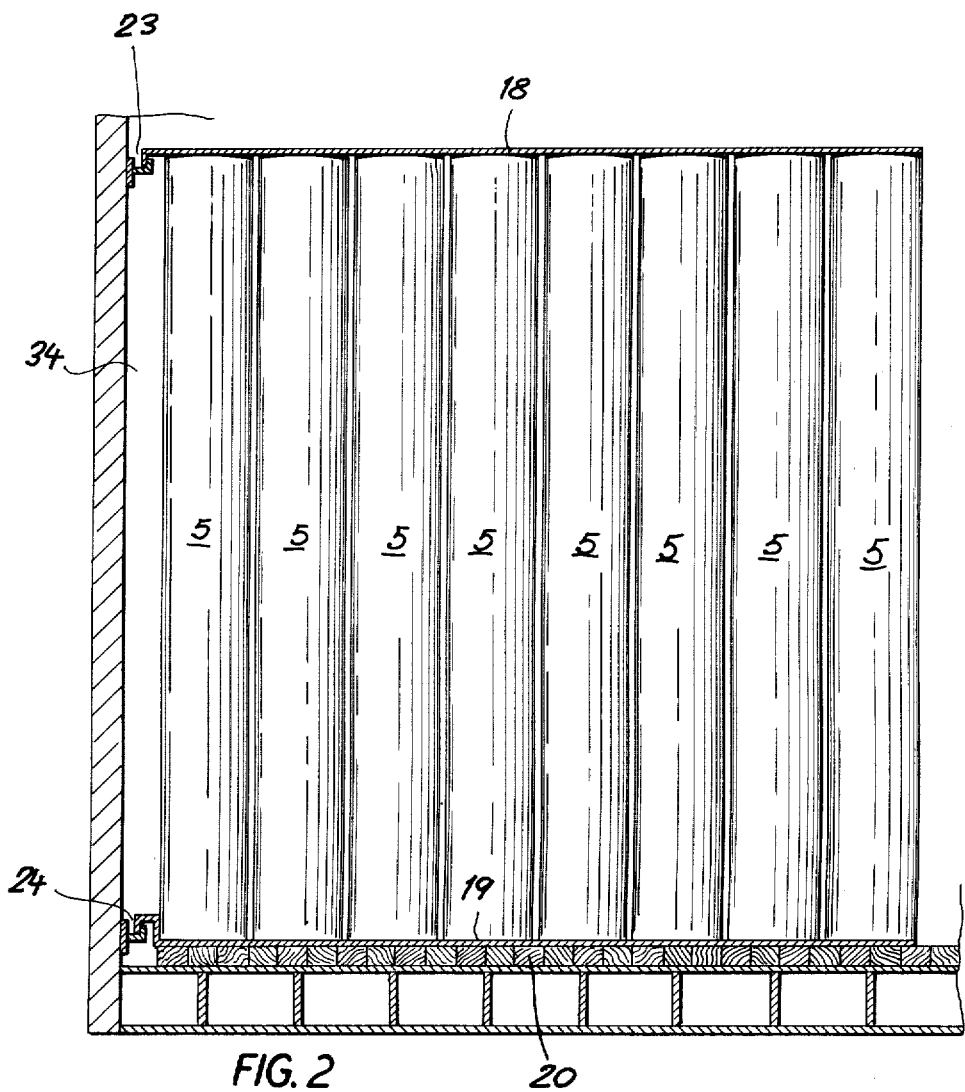
FIG. 2 is a vertical-section showing in side view one of the groups of storage vessels of a modification of the system of FIG. 1 as viewed in the plane of the longitudinal axis of the ship.
Figure 3:
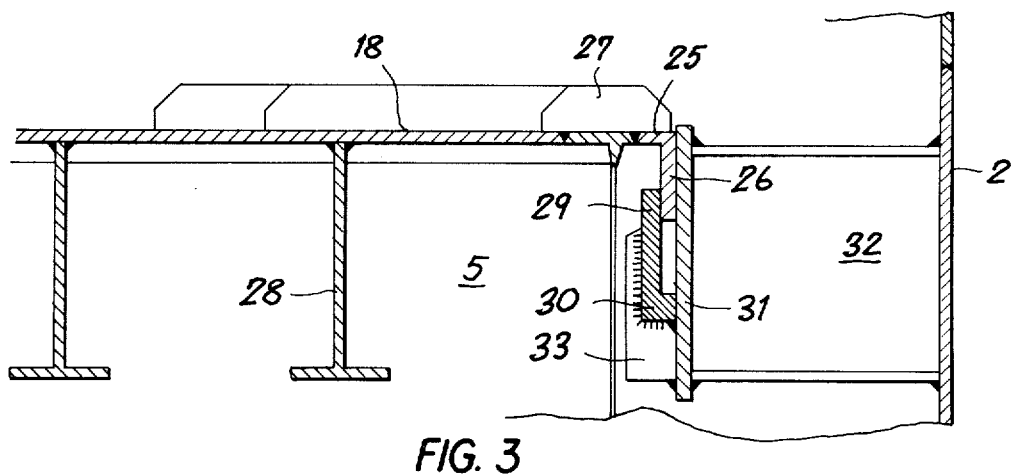
FIG. 3 is a detailed view, drawn to an enlarged scale, of the anchoring assembly for the system of FIGS. 1 and 2.

FIGS. 2 and 3 show another embodiment of the invention in which the fluid containers 6–9 are provided with a closed upper plate 18 and a similarly closed lower plate 19, and are peripherally welded to these plates so that they are held thereby in the respective groups. The bottom plate 19 is freely seated upon an insulating layer 20 deposed above the upper floor of the ship's hull or upon a deck and constituted, as can be seen from FIG. 2, as a layer of wood boards.

The upper and lower connections between the coffer dam and the groups and between the latter and the lateral walls of the ship are interengaging upwardly and downwardly turned members. For example, in the upper portion of each fluid container or group, a downwardly turned member 23 may engage in an upwardly open channel faced to the coffer dam or wall. Similarly, downwardly turned anchors 24 engaged in upwardly open channels along the bottom of each contour group, the channels being arranged along the coffer dams and walls as described in connection with FIG. 1. Between the coffer dam and ship wall (not seen in FIG. 2) and the fluid container or group, there may be introduced a yieldable or elastic insulating layer in the space represented at 34, preferably in the form of mineral wool.

FIG. 3 shows in detail a system whereby the containers may be anchored to the coffer dam or ship's wall. In this system, a first anchor 25 has a downwardly bent portion 26 and is welded to the plate 18 of the group of containers 5. An additional metal-profile strip 27 is interposed between the plate and the anchor 25 to reinforce this weld connection. Furthermore, the upper portions of the containers 5 are reinforced by vertical T-section metal girders 28.

The downwardly bent portion 26 engages in the channel formed by upwardly turned member 29 carried by the guide rail 31 which is mounted on a girder construction 32 upon the coffer dam 2. The result is a stable connection between the side of the group and the coffer dam. The second anchor 30 is reinforced by a web or profile 33 which is welded thereby and to the rail 31 as indicated.

Figure 4:
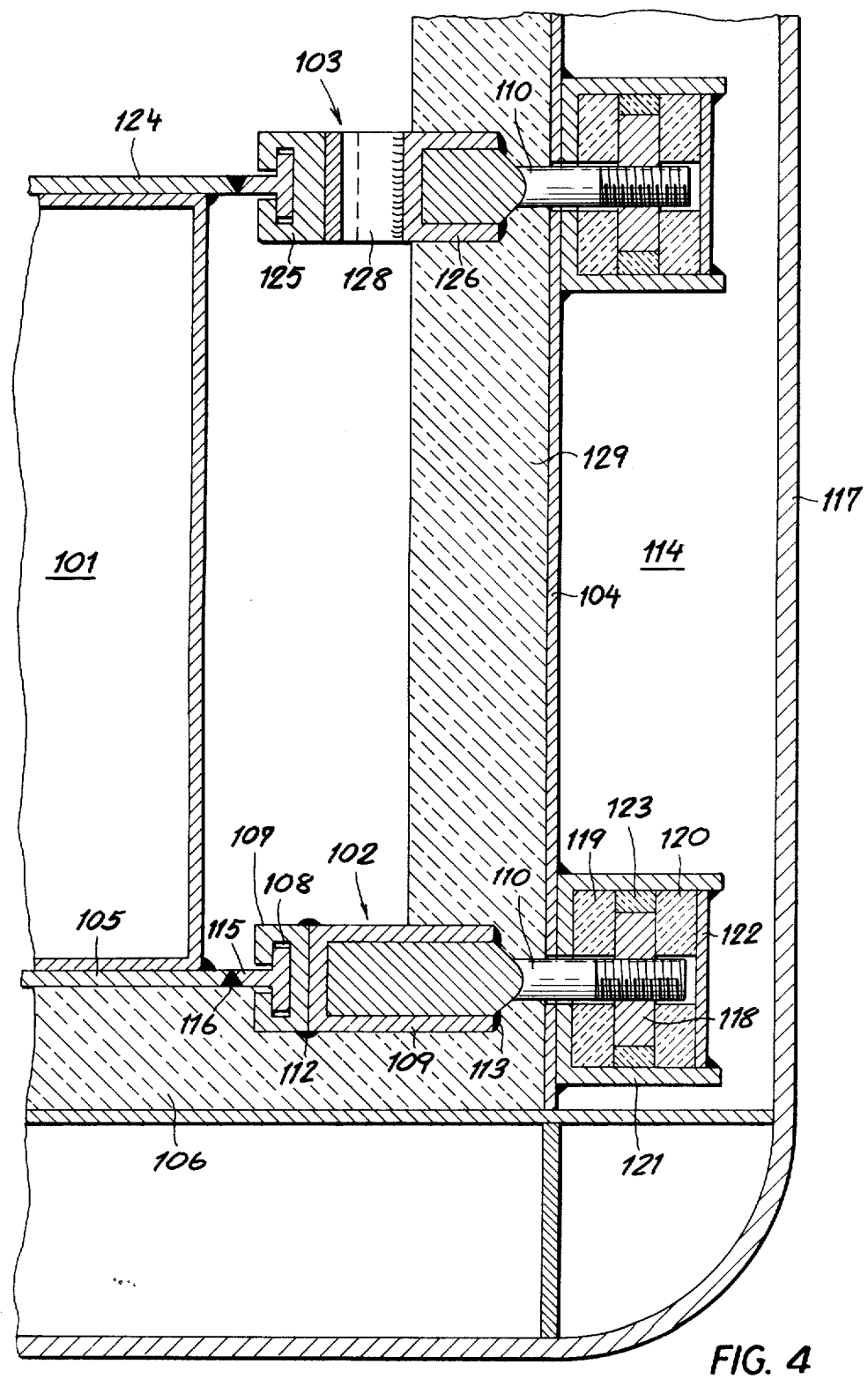
FIG. 4 is a vertical section showing another system for securing the storage vessels.

FIG. 4 shows a storage vessel 101 for liquefied natural gas (methane) which is connected by a lower and an upper assembly 102, 103, respectively, with the inner wall 104 of a double-wall tankship hull. In this case, in place of the individual group or fluid container, a single storage vessel having the capacity approximating that of each group may be secured to two mutually perpendicular walls, the other two lateral walls of the rectangular container being free from connection to the walls of the hold or a coffer dam.

The storage vessel 101 is welded to the load-supporting bottom plate 105 of the floor of the hold, the bottom plate being carried upon the bottom insulation layer 106 which, in turn is disposed above a hold plate having a bilge therebelow. The load-supporting thermal insulation 106 may be comprised of slabs or layers of mineral fiber (glass fiber) impregnated with a hardened phenol or urea formaldehyde resin or epoxy.

The lower anchoring assembly includes a horizontal guide rail 107 which is of C cross-section to define an inwardly open channel 108 overhung by inwardly turned ledges of the guide rail. A horizontally extending post 109 having a U profile carries the rail 107 which is welded thereto at weld seams 112 while bolts 110 and 111 horizontally spaced along in channel 109 (see also FIG. 5) serve to support this latter member.

The guide rail 107 is thus rigidly secured to the channel beam 109 and the channel beam 109 is rigidly secured to the bolts 110 via the weld seam 113. The bolt 111 seen in FIG. 4 to be spaced behind the bolt 110, provided with an analogous attachment to the beam 109.

The rigidity of the beam 109 is so dimensioned that the forces applied thereto are distributed uniformly to the two bolts 110 and 111 and thereby onto the inner wall or bulkhead of the ship's hold.

The connection between the guide rail 107 and the container 101 is effected via the support plate 105 of the latter and includes a T-cross section beam 115 which is received in the horizontal opening 108 of the guide rail 107 and is welded at 116 rigidly to the plate 105. Thus relative horizontal movement of the members 115 and 107 is permitted.

The connection between the beams 110 and the inner wall 104 of the ship is effected by the end of the beam projecting into the compartment 114 between the inner wall 104 and outer wall 117 of the ship. A ring 118 is threaded onto this end of the bolt 110 and is held between a pair of hollow cylindrical blocks 119 and 120 of a relatively rigid thermally insulating material such as Ferrozell or Pertinax, or the insulating material described previously. The blocks 119 and 120 are received within a stiffening housing 121 whose mouth turned away from the wall 104 is closed sealingly and in force transmitting relationship with a plate 122 welded hermetically to the housing 121. A further ring 123 of thermally insulating material reduces the heat transfer between the ring 118 and the housing 121.

The lower anchoring assembly 102 thus provides freedom of movement of the container in the horizontal direction to enable compensation of relative differences in thermal expansion and contraction between the storage vessel 101 and the inner wall 104 of the ship. All vertical relative movements of the container and the ship's wall is likewise taken up by the anchoring system in which the T-section member 115 is received with play in the vertical direction within the guide channel 107.

Figure 5:
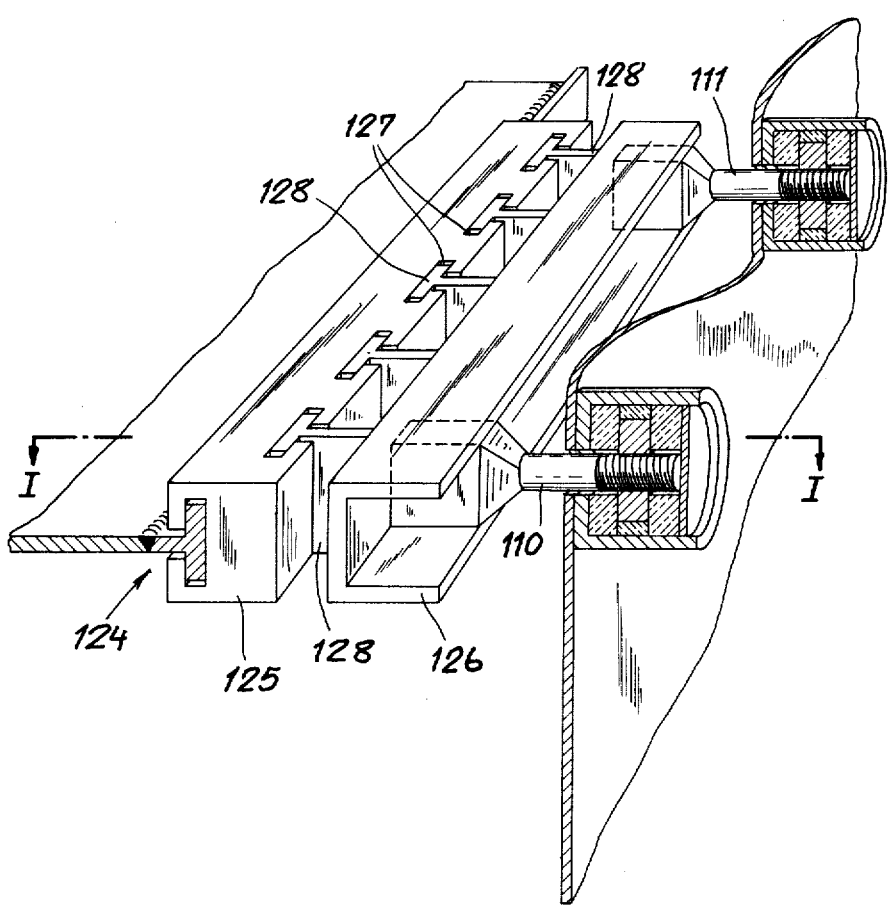
FIG. 5 is a perspective view of the upper fastening system for the container arrangement of FIG. 4.

Advantageously, the guide channel 107, the support beam 109 and the bolts 110 and 111 (FIGS. 4 and 5)

are composed of metal having a low thermal conductivity, especially $V_2$ steel.

The upper anchoring assembly 103 comprises a similar T-section member welded to the cover plate 124 to which the container 1 is, in turn welded, and differs from the lower assembly only in the mounting of the guide rail 125 upon the support beam 126. All of the structural details are similar to those of the lower anchoring assembly 102 and have been given the same reference numerals. The difference in the mounting of the guide channel 125 upon the support beam has been shown in greater detail in FIG. 5 which represents a perspective view of the upper assembly of the device of the system of FIG. 4.

In FIG. 5 the guide rail 125 is provided with a plurality of vertically extending horizontally spaced T-section grooves 127 receiving T-section vertical bars 128 with freedom of vertical movement. The shanks of the bars 128 are secured to the rearwardly open U-section beam 126 mounted by bolts 110 and 111 on the inner wall of the hold as previously described for the lower assembly (FIG. 4).

Thus the upper anchoring assembly provides two degrees of relative displacement of the tank and the ship wall, namely, one parallel to the horizontal channel of guide member 125 and the other parallel to the vertical grooves 127. The upper assembly can thus permit vertical shrinkage and expansion of the tank.

Since both the upper and lower assemblies have at least two bolts, a uniform force transmission from the assembly to the ship wall is guaranteed, i.e. non-distributed forces or stresses do not arise in the assemblies. A layer 129 of thermal insulation is provided along the inner wall 104 of the hold and is spaced from the juxtaposed surface of the storage vessel 101 so that damage to the insulating layer does not result from relative movement of the tank and the wall of the hold.

We claim:

1. A conveyance for the transport of a low-temperature fluid, especially a liquefied gas, comprising:
   a thermally-insulated cargo compartment having a plurality of lateral vertical walls including two mutually angularly adjoining walls;
   at least one fluid container received in said compartment, said fluid container comprising a multiplicity of generally similar neighboring receptacles secured together and defining a pair of flanks each juxtaposed with one of said mutually angularly adjoining walls; and
   respective assemblies anchoring said container to said mutually angularly adjoining walls at each said flank with freedom of movement of the respective flank parallel to the juxtaposed wall but rigidly connecting the respective flank to said juxtaposed wall against displacement of said flank perpendicularly thereto, said fluid container being free from attachment to the vertical walls of said compartment other than said two mutually angularly adjoining walls.

2. The conveyance defined in claim 1 wherein said neighboring receptacles comprise shells which are reinforced at least at one end of each receptacle.

3. The conveyance defined in claim 1 wherein each one of said neighboring receptacles is formed with flat flanges at its upper and lower ends, the flange of each one of said neighboring receptacles being welded to the flanges of adjacent neighboring receptacles.

4. The conveyance defined in claim 1 wherein each of said neighboring receptacles has a generally flat top and a generally flat bottom, the top and bottom of each of said neighboring receptacles being rigidly connected to the top and bottom of an adjacent neighboring receptacle.

5. The conveyance defined in claim 1, further comprising a top plate and a bottom plate extending perpendicular to said juxtaposed walls and common to said neighboring receptacles of said fluid container a, said neighboring receptacles being welded to said top and bottom plates at the upper and lower ends of said neighboring receptacles.

6. The conveyance defined in claim 3, wherein said top and bottom plates are imperforate and said neighboring receptacles each comprise a cylindrical shell having open ends, said open ends of said shells being peripherally welded to said top and bottom plates.

7. The conveyance defined in claim 5 wherein at least one of said plates is provided with a multiplicity of openings, each of said openings respectively receiving one of said neighboring receptacles, each of said neighboring receptacles being peripherally welded around the opening in which it is received.

8. The conveyance defined in claim 1 wherein each of said neighboring receptacles is formed with a ring at its upper and lower ends, each said ring comprising an annular flange having a polygonal outer periphery and a circular inner periphery, each of said neighboring receptacles having a cylindrical shell welded to the inner periphery of its respective rings, the sides of the polygonal outer peripheries of each of said rings being welded to the sides of the polygonal outer periphery of the rings of adjacent neighboring receptacles.

9. The conveyance defined in claim 8 wherein said rings have equilateral hexagonal outer peripheries.

10. The conveyance defined in claim 1 wherein each of said assemblies comprises a downwardly bent member and an upwardly bent member interengaging and enabling relative horizontal displacement, one of said members being secured to one of said mutually adjoining walls and the other of said members being secured to the juxtaposed flank of said fluid container.

11. The conveyance defined in claim 10 wherein a row of such assemblies is provided along an upper portion of each flank of said fluid container juxtaposed with one of said mutually adjoining walls and another row of such assemblies is provided along the bottom of each flank of said fluid container juxtaposed with one of said mutually adjoining walls.

12. The conveyance defined in claim 11 wherein each row of said assemblies comprises a plurality of spaced horizontally aligned guide rails carrying the upwardly bent members.

13. The conveyance defined in claim 12 wherein the length of the interengaging upwardly and downwardly bent portions of the members of said assemblies is greater than the thermal shrinkage movement of the container group in the vertical direction.

14. The conveyance defined in claim 12 wherein the horizontal width of each upwardly bent member is greater than that of each downwardly bent member engageable therewith.

15. The conveyance defined in claim 1 wherein said one said juxtaposed walls is provided with a layer of thermal insulation, said assembly being disposed outside said layer.

16. A conveyance for the transport of a low-temperature fluid, especially a liquified gas, comprising:
- a thermally insulated cargo compartment having a plurality of lateral vertical walls including two mutually angularly adjoining walls;
- at least one storage vessel received in said conpartment, said storage vessel defining a pair of flanks each juxtaposed with one of said mutually angularly adjoining walls; and respective assemblies anchoring said storage vessel to mutually angularly adjoining walls at each said flank with freedom of movement of the respective flank parallel to the juxtaposed wall but rigidly connecting the respective flank to said juxtaposed wall against displacement of said flank perpendicularly thereto, said storage vessel being free from attachment to the vertical walls of said compartment other than said two mutually adjoining walls;
- one such assembly being provided at an upper portion of said storage vessell and another such assembly being provided at a lower portion of said storage vessel, each of said assemblies comprising a horizontally extending C-cross section channel opening toward said storage vessel, means mounting said channel on said one of said juxtaposed walls, and at least one T-section bar extending from said storage vessel and received in said channel for relative horizontal displacement of said bar and said channel parallel to said one of said juxtaposed walls.

17. The conveyance defined in claim 16 wherein said means mounting said channel includes a plurality of bolts connected to said channel and extending perpendicular to said one of said juxtaposed walls and secured thereto.

18. The conveyance defined in claim 17 wherein said means mounting said channel includes a rail extending substantially all across said one of said juxtaposed walls along said storage vessel and of a rigidity sufficient to transfer forces perpendicular to said one of said walls thereto uniformly at said bolts.

19. The conveyance defined in claim 18 wherein said rail of the upper assembly is provided with a plurality of vertical T-section members in horizontally spaced relationship and said channel is formed with vertical extending horizontally spaced T-slots respectively receiving said members and enabling relative vertical displacement of said rail and said channel.

20. The conveyance defined in claim 17 wherein said one of said juxtaposed walls is part of a double-wall structure of a tank ship having a space behind said one of said juxtaposed walls, said bolts projecting into said space, said conveyance further comprising a body of thermally insulating material of high compressive strength interposed between each of said bolts and said one of said juxtaposed walls for effecting force-transmission therebetween.

21. The conveyance defined in claim 20 wherein each assembly is composed at least in part of material of low thermal conductivity.

22. The conveyance defined in claim 20 wherein said one of said juxtaposed walls is formed in said space with a housing spacedly surrounding each of said bolts, each of said bolts has a ring threadedly mounted thereon within the respective housing, and said body of insulating material is an annulus of thermal insulation disposed in the respective housing between the respective ring and said one of said juxtaposed walls.

23. The conveyance defined in claim 22, further comprising another annulus of thermal insulation of high compressive strength engaging said ring of each bolt, and a plate closing said housing and extending transversely to said bolt while forming a seat for said other annulus.

* * * * *